July 28, 1931. C. LIPPER Re. 18,139

TEXTILE FABRIC

Original Filed Oct. 6, 1928

INVENTOR

Clarence Lipper,

BY Leonard L. Kalish

ATTORNEY

Reissued July 28, 1931

Re. 18,139

UNITED STATES PATENT OFFICE

CLARENCE LIPPER, OF PHILADELPHIA, PENNSYLVANIA, ASSIGNOR TO LIPPER MANUFACTURING CO., INC., OF PHILADELPHIA, PENNSYLVANIA, A CORPORATION OF PENNSYLVANIA

TEXTILE FABRIC

Original No. 1,698,639, dated January 8, 1929, Serial No. 310,873, filed October 6, 1928. Application for reissue filed February 19, 1929. Serial No. 341,154.

My invention relates to a new and useful improvement in textile fabric and it relates more particularly to a novel woven fabric having a resilient stiffening mesh, preferably on one side thereof, generally invisible from a surface thereof and woven simultaneously with the body of the fabric and interlaced therewith at intervals sufficiently frequent to afford the body fabric the necessary support when in use.

My invention relates more particularly to a novel textile fabric comprising a body formed of relatively flat, limp and bulky strands of artificial cellulose interlaced in any suitable manner and artificial cellulose stiffening strands having a different cross-sectional shape from that of the body strands and being relatively stiffer and relatively less spacious than said body strands, interlaced with body strands at suitable intervals and concealed by said body strands so as to be substantially invisible on a surface of the body.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings illustrative of my invention and in which like reference characters indicate like parts:

Figure 1:
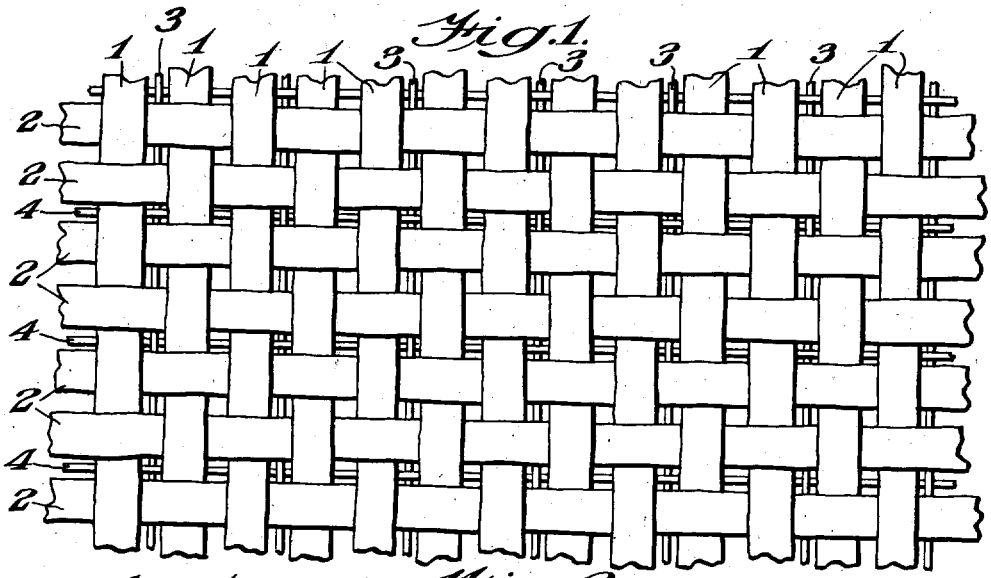
Figure 1 represents a top plan view of a fabric embodying my invention, shown on a greatly enlarged scale and in a somewhat diagrammatic manner.

The novel fabric of my present invention may be woven on a loom with two sets of warp threads and two sets of weft threads, or two shuttles.

The warp threads of the body as well as the weft threads of the body may be any suitable relatively limp and bulky material which will lie relatively flat, while the warp and weft threads of the stiffening mesh or weave may be any relatively less spacious and stiffer threads having a generally round, cross-sectional shape or a cross-sectional shape different from that of the body threads insofar as they will, by reason of their inherent cross-sectional shape, afford greater resistance to bending for any given cross-sectional area.

The warp threads of the body as well as the weft threads of the body may be any suitable material such as artificial "straw", while the warp and weft threads of the stiffening mesh or weave may be any suitable stiffening strands, such as horsehair, artificial "horsehair", or the like.

In the particular embodiment of my invention shown in the drawings, the fabric is especially adapted for use in making ladies' hats. Thus, for instance, in this particular embodiment I employ for the body warp and weft threads, suitable flat strands of visca or other artificial cellulose product, such as artificial straw or the like. By "artificial cellulose" I comprehend the various regenerated cellulose products as well as cellulose derivatives.

The body weft and warp strands designated by the numerals 1 and 2 respectively, may each be composed of two or more independent flat threads of visca or other suitable material and the general cross-section of the entire warp or weft strand is correspondingly flat.

Figure 3:
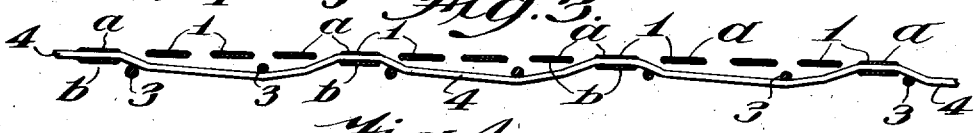
Figure 3 represents a section on line 3—3 of Figure 2 taken parallel to the warp of the fabric and with the warp threads of the body omitted from the drawing for greater clarity, and with the thickness of the body and weft threads much exaggerated for convenience and simplicity in illustration.
Figure 4:
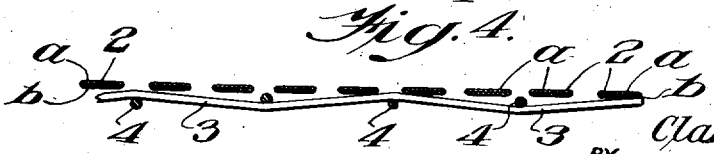
Figure 4 represents a section on line 4—4 of Figure 2 taken parallel to the weft of the fabric and with the body weft threads omitted for greater clarity, and with the thickness of the body warp threads much exaggerated for convenience and simplicity in illustration.

In Figures 3 and 4 of the drawings I have, for the sake of illustration, shown in cross-section the wefts and warps respectively, as formed of two flat threads *a* and *b*, although in actual practice more than two threads may go to make up a body warp and a body weft strand.

Figure 2:
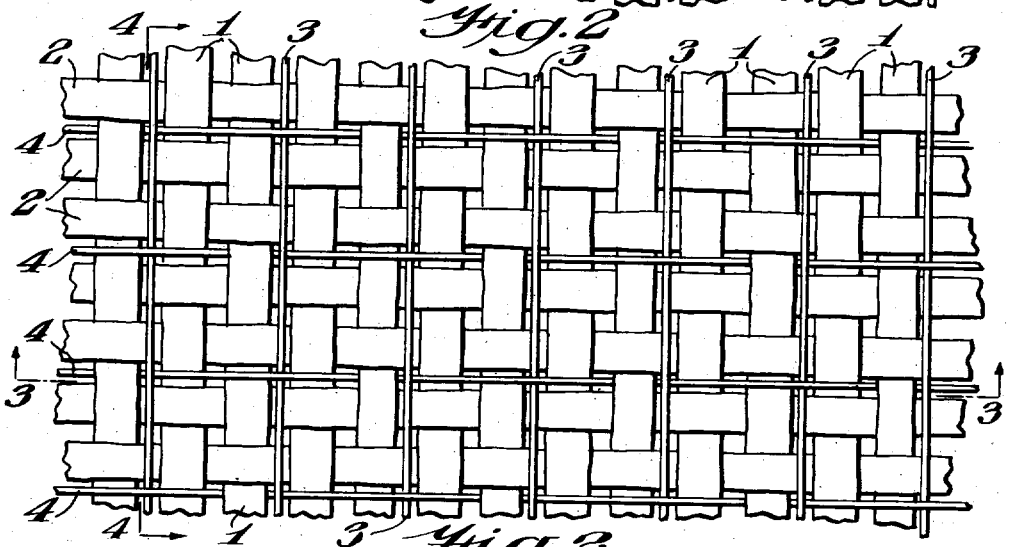
Figure 2 represents a plan view of the reverse or back side of the fabric similarly enlarged and also in a diagrammatic manner.

On the reverse side of the fabric, shown particularly in Figure 2, two right angular sets of stiffening strands are disposed, running weft-wise and warp-wise, and designated by the numerals 3 and 4 respectively. The stiffening threads 3 and 4 are preferably less frequent than the body weft and warp threads 1 and 2 respectively and may be laid as frequently as desirable. In the particular embodiment of my invention illustrated in the drawings there are one half as many stiffening strands as there are body weft and warp strands. Thus, the stiffening strands 3 and 4 are interwoven with each other in a plain weave to form a relatively open mesh or gauze on the reverse side surface of the body of the fabric.

The weave of the body of the fabric formed of weft and warp strands 1 and 2 and the weave of the stiffening mesh formed of the strands 3 and 4 are preferably independent of each other except for an occasional interlacing of the warp reinforcing threads 4 with the "*a*" threads of certain of the weft body strands 1. Thus, in the particular embodiment of my invention shown in the drawings, the warp reinforcing threads 3 and 4 interlace with the thread "*a*" of every fourth body weft strand 1, thereby to establish a connection between the body weave and the reinforcing or stiffening mesh or gauze on the rear surface of the body. The interlacing of adjacent warp stiffening threads 4 with the body weft strands 1 is preferably staggered, as indicated particularly in Figure 2, so that two adjacent stiffening warp strands 4 will not interlace with the same body weft strands 1 but will interlace with every second or some intermediate body weft strand, depending upon the frequency of interlacing between the stiffening warp strands and body weft strands. By this means, the attachment points between the body fabric and the reinforcing or stiffening mesh or weave is distributed more uniformly throughout the surface of the fabric.

In the drawings, the fabric has been much enlarged so as more clearly to illustrate the invention and thus the spaces between the body weft strands and body warp strands have been likewise enlarged. Thus, in Figure 1, the stiffening weft and warp strands 3 and 4 are generally visible through the open spaces between the body weft and warp strands 1 and 2. In the actual fabric, however, the space between the body weft strands and body warp strands is practically negligible so that the stiffening strands 3 and 4 may be entirely invisible from the face surface of the fabric (Figure 1).

The essential feature of my textile fabric is the novel combination of relatively spacious and limp body strands which lie generally flat in the finished fabric, and relatively stiffer though less spacious stiffening strands, preferably made of the same substance as the body strands and of a cross-sectional shape generally so different from that of the body strands as to give the same a greater resistance to bending for a given area of cross-section, interlaced with said body strands at suitable intervals, whereby a desired resiliency may be imparted to the body of the fabric by said stiffening strands by reason of said difference in cross-sectional shape and whereby said relatively flat and bulky body strands will tend to cover and conceal said stiffening strands by reason of said difference in the aggregate or individual cross-sectional area between said body and stiffening strands.

In the particular embodiment of my invention, the body strands 1 and 2 are composed of a plurality of flat, ribbon-like threads or filaments of artificial cellulose, such as visca; while the stiffening strands 3 and 4 are single filaments of artificial cellulose of generally round cross-sectional shape.

By my novel construction, therefore, I am able to produce a fabric of any suitable weave or texture and to so reinforce or stiffen the fabric on the reverse side thereof as not to be at all visible on the face thereof and so as also to minimize the weight or thickness of the resultant product. Thus, a fabric embodying my invention may be woven in any desired weave and a stiffening gauze or mesh may be applied to the rear surface without destroying or in any way affecting the surface texture.

While it is preferable to impart equal resiliency to the fabric weft-wise and warp-wise, the resiliency in these two directions may be varied by the amount or frequency of the stiffening strands running weft-wise and warp-wise, respectively. Thus, too, if desired, the stiffening strands may be extended only in one direction, either weft-wise or warp-wise. Thus, too, the body strands may be caused to cover and conceal the stiffening strands on either side of the fabric or on both sides thereof and to any extent desired.

My novel fabric finds numerous applications, particularly in fabric designed for use in hats and the like. Thus, my invention is particularly applicable to the making of visca or artificial cellulose fabrics for ladies' hats and the like, which the rear stiffening mesh or gauze attached to the rear face of the fabric will so stiffen the fabric as to afford the same support sufficient to maintain the shape of the hat without any wire or any other bracing or sizing, or the like.

The stiffening mesh of my novel fabric may be formed of natural hair threads or artificial hair threads of artificial cellulose or the like, such as artificial horsehair, or in fact any suitable stiff thread.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. A textile hat fabric of the character stated, comprising a body formed of artificial cellulose warp and weft threads interlaced in any suitable manner, and a stiffening mesh on one side of said body and invisible from the other side thereof, said stiffening mesh being formed of threads having suitable resiliency and being interlaced with body threads at intervals.

2. A textile fabric comprising a body formed of multi-strand artificial cellulose warp and weft threads interlaced with each other in any suitable manner, and a stiffening mesh on one side of said body and invisible from the other side thereof composed of threads of suitable resiliency passed between constituent elements of the individual strands of the body threads at suitable intervals.

3. A textile hat fabric comprising a body formed of multi-strand warp and weft threads interlaced with each other and a stiffening mesh on one side of said body composed of artificial cellulose threads of suitable resiliency interwoven between constituent elements of the individual strands of the multi-strand body threads at suitable intervals.

4. A textile fabric comprising a body formed of multi-strand artifical cellulose threads interlaced with each other in any suitable manner and a stiffening mesh on one side of said body composed of artificial cellulose threads of suitable stiffness passed between constituent elements of the multi-strand body threads at suitable intervals.

5. A textile fabric comprising a body formed of artificial cellulose threads interlaced with each other in any suitable manner and a stiffening mesh on one side of said body, formed of sets of artificial cellulose warp and weft threads of suitable stiffness, only one of said sets of stiffening threads being interlaced with threads of the body at intervals.

6. A textile fabric comprising a body formed of artificial straw warp and weft threads and a stiffening mesh formed of artificial cellulose threads of suitable stiffness interlaced with body threads at intervals.

7. A textile fabric of the character stated, comprising a body formed of artificial straw warp and weft threads interlaced in any suitable manner and a stiffening mesh on one side of said body, formed of sets of warp and weft threads of suitable stiffness; one of said sets of stiffening thread being interlaced with threads of the body at intervals.

8. A textile fabric comprising a body including relatively flat, ribbon-like, artificial cellulose threads and stiffening threads interlaced with threads of said body at suitable intervals, and extending substantially straight through the fabric.

9. A textile fabric including a body having warp and weft threads, either of which are relatively flat, ribbon-like, artificial cellulose threads and generally round artificial cellulose stiffening threads interlaced with threads of said body at suitable intervals, and extending substantially straight through the fabric.

10. A textile fabric including a body comprising relatively flat, ribbon-like, artificial cellulose threads and a stiffening mesh on one side of said body, comprising relatively round artificial cellulose stiffening threads interlaced with said body threads at suitable intervals.

11. A textile fabric of the character stated, comprising a body formed of relatively limp, artificial cellulose warp and weft threads interlaced in any suitable manner, and artificial cellulose stiffening threads having a different cross-sectional shape from that of the body threads and being relatively stiffer, interlaced with body threads at suitable intervals and concealed by said body threads so as to be substantially invisible on a surface of the body.

12. A textile fabric of the character stated comprising a body including relatively limp and bulky artificial cellulose threads which lie relatively flat, and generally straight artificial cellulose stiffening threads interlaced with body threads at suitable intervals, being relatively less spacious and stiffer than said body threads and having a cross-sectional shape different from that of the body threads in so far as they will, by reason of their inherent cross-sectional shape, afford greater resistance to bending for any given cross-sectional area.

13. A millinery and trimming textile fabric comprising a body formed of relatively bulky and limp warp and weft threads interlaced with each other, and generally straight artificial cellulose stiffening threads, much less spacious and stiffer than said body threads, interlaced with said body threads at suitable intervals and extending substantially straight through the fabric, and being substantially concealed from view by said body threads, on at least one side of the fabric, by reason of the relatively much greater bulk of the body threads with the respect to the stiffening threads.

14. A millinery and trimming textile fabric comprising a body formed of relatively bulky and limp multi-strand warp and weft threads interlaced with each other, and generally straight and untwisted stiffening threads, much less spacious and stiffer than said body threads, interlaced with said body at suitable intervals and extending substantially straight through the fabric, and being substantially concealed from view by said body threads, by reason of the relatively much greater bulk of the body threads with the respect to the stiffening threads.

In witness whereof I have hereunto set my hand and seal this 11th day of January, 1929.

CLARENCE LIPPER.